US011340602B2

(12) United States Patent
Giering et al.

(10) Patent No.: US 11,340,602 B2
(45) Date of Patent: May 24, 2022

(54) SENSOR DATA FUSION FOR PROGNOSTICS AND HEALTH MONITORING (71) Applicant: United Technologies Corporation, Farmington, CT (US)

(72) Inventors: Michael J. Giering, Bolton, CT (US); Madhusudana Shashanka, Santa Clara, CA (US); Soumik Sarkar, Ames, IA (US); Vivek Venugopalan, Bridgewater, NJ (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 988 days.

(21) Appl. No.: 15/535,909

(22) PCT Filed: Dec. 18, 2015

(86) PCT No.: PCT/US2015/066673
§ 371 (c)(1),
(2) Date: Jun. 14, 2017

(87) PCT Pub. No.: WO2016/100816
PCT Pub. Date: Jun. 23, 2016

(65) Prior Publication Data
US 2018/0217585 A1 Aug. 2, 2018

Related U.S. Application Data

(60) Provisional application No. 62/094,681, filed on Dec. 19, 2014.

(51) Int. Cl.
*G05B 23/02* (2006.01)
*G06N 3/04* (2006.01)
(Continued)

(52) U.S. Cl.
CPC ..... *G05B 23/0254* (2013.01); *G05B 23/0294* (2013.01); *G06K 9/6273* (2013.01);
(Continued)

(58) Field of Classification Search
CPC .................................................. G05B 23/0254
See application file for complete search history.

(56) References Cited

U.S. PATENT DOCUMENTS 5,373,460 A * 12/1994 Marks, II .............. G06F 17/141
704/E11.002
6,578,040 B1 6/2003 Syeda-Mahmood
(Continued)

OTHER PUBLICATIONS

Tran et al., "An approach to fault diagnosis of reciprocating compressor valves using Teager-Kaiser energy operator and deep belief networks", Jul. 2014, Expert Systems with Applications, vol. 41 Issue 9, pp. 4113-4122 (Year: 2014).*
(Continued)

*Primary Examiner* — Daniel C Puentes
(74) *Attorney, Agent, or Firm* — Cantor Colburn LLP (57) ABSTRACT

A method includes converting time-series data from a plurality of prognostic and health monitoring (PHM) sensors into frequency domain data. One or more portions of the frequency domain data are labeled as indicative of one or more target modes to form labeled target data. A model including a deep neural network is applied to the labeled target data. A result of applying the model is classified as one or more discretized PHM training indicators associated with the one or more target modes. The one or more discretized PHM training indicators are output.

14 Claims, 5 Drawing Sheets

(51) Int. Cl.
*G06K 9/62* (2022.01)
*G06V 10/44* (2022.01)
*G06V 20/56* (2022.01)
*G06T 7/246* (2017.01)
*G06N 3/08* (2006.01)

(52) U.S. Cl.
CPC ......... *G06K 9/6289* (2013.01); *G06N 3/0454* (2013.01); *G06N 3/08* (2013.01); *G06T 7/248* (2017.01); *G06V 10/454* (2022.01); *G06V 20/56* (2022.01)

(56) References Cited

U.S. PATENT DOCUMENTS

| | | | |
|---|---|---|---|
| 8,390,675 | B1 | 3/2013 | Riederer |
| 2006/0221072 | A1 | 10/2006 | Se et al. |
| 2011/0231169 | A1* | 9/2011 | Furem ............... E02F 9/267 703/2 |
| 2011/0288714 | A1 | 11/2011 | Flohr et al. |
| 2013/0177235 | A1 | 7/2013 | Meier |
| 2014/0019388 | A1* | 1/2014 | Kingsbury ............ G06N 20/00 706/12 |
| 2014/0195192 | A1 | 7/2014 | Kimishima |
| 2014/0222425 | A1 | 8/2014 | Park et al. |
| 2014/0226855 | A1 | 8/2014 | Savvides et al. |
| 2014/0253760 | A1 | 9/2014 | Watanabe et al. |
| 2014/0294088 | A1 | 10/2014 | Sung et al. |
| 2014/0333787 | A1 | 11/2014 | Venkataraman et al. |
| 2016/0098037 | A1* | 4/2016 | Zornio ............. G05B 19/41855 700/20 |

OTHER PUBLICATIONS

Khunarsal et al, "Very short time environmental sound classification based on spectrogram pattern matching", Sep. 2013, Information Sciences, vol. 243, pp. 57-74 (Year: 2013).*

Khunarsal et al., "Very short time environmental sound classification based on spectrogram pattern matching", Sep. 2013, Information Sciences, Vo. 243, all pages (Year: 2013).*

Suhaimi, Emil Zaidan bin, "Intelligent Sensor Data Pre-processing Using Continuous Restricted Boltzmann Machine", Oct. 2013, all pages (Year: 2013).*

Khunarsal et al., "Very short time environmental sound classification based on sptectrogram pattern matching", Sep. 2013, Information Sciences, Vo. 243, all pages (Year: 2013).*

Dahl et al, "Large Scale Malware Classification Using Random Projections and Neural Networks", May 2013, IEEE, all pages (Year: 2013).*

Suhaimi, Emil Zaidan, "Intelligent Sensor Data Pre-Processing Using Continuous Restricted Boltzmann Machine", Oct. 2013, UTPedia, all pages (Year: 2013).*

B. Wu, et al., "Fast pedestrian detection with laser and image data fusion," Proceedings of the 6th International Conference on Image and Graphics, Aug. 12, 2011, pp. 605-608.

C. Premebida et al., "LIDAR and vision-based pedestrian detection system," Journal of Field Robotics, vol. 26, No. 9, Sep. 1, 2009, pp. 696-711.

International Application No. PCT/US2015/066664 International Search Report and Written Opinion, dated Apr. 26, 2016, 12 pages.

International Application No. PCT/US2015/066673 International Search Report and Written Opinion, dated Apr. 6, 2016, 12 pages.

J. Ngiam, et al., "Multimodal Deep Learning," Proceedings of the 28th International Conference in Machine Learning (ICML '11), Jun. 28, 2011, pp. 689-696.

J. Sun, et al., "Application of Deep Belief Networks for Precision Mechanism Quality Inspection," IFIP Advances In Information And Communication Technology, vol. 435, Feb. 16, 2014, pp. 87-93.

J. Xie, et al., "Learning Features from High Speed Train Vibration Signals with Deep Belief Networks," 2014 International Joint Conference on Neural Networks, Jul. 6-11, 2014, pp. 2205-2210.

M. Szarvas et al., "Real-time pedestrian detection using LIDAR and convolutional neural networks," Proceedings of the 2006 IEEE Intelligent Vehicles Symposium, Jun. 13-15, 2006, pp. 213-218.

N.K. Verma, et al. "Intelligent Condition Based Monitoring of Rotating Machines using Sparse Auto-encoders," Proceedings of the 2013 IEEE Conference on Prognostics and Health Management, Jun. 24, 2013, 7 pages.

P. Tamilselvan, et al., "Deep Belief Network Based State Classification for Structural Health Diagnosis," Proceedings of the 2012 IEEE Aerospace Conference, Mar. 3, 2012, 11 pages.

V.T. Tran et al., "An approach to fault diagnosis of reciprocating compressor valves using Teager-Kaiser energy operator and deep belief networks," Expert Systems With Applications, vol. 41, No. 9, Dec. 29, 2013, pp. 4113-4122.

Z. Kira, et al., "Long-Range Pedestrian Detection using Stereo with a Cascade of Convolutional Network Classifiers", Proceedings of the 2012 IEEE/RSJ International Conference on Intelligent Robots and Systems, Oct. 7, 2012, 8 pages.

"Elements of artificial neural networks"; Mehrotra, 1997, 351 pages.

* cited by examiner

SENSOR DATA FUSION FOR PROGNOSTICS AND HEALTH MONITORING

CROSS REFERENCE TO RELATED APPLICATIONS

This application is a National Stage application of International Patent Application Serial No. PCT/US2015/066673, filed Dec. 18, 2015, which claims benefit to U.S. Provisional Application No. 62/094,681, filed Dec. 19, 2014, which are incorporated herein by reference in their entirety.

BACKGROUND

This disclosure relates to processing of sensor data, and more particularly to sensor data fusion for prognostics and health monitoring applications.

Complex engineered systems including such things as helicopters, jet engines, heating, ventilating, and air conditioning (HVAC) systems and elevators typically are systematically monitored to make sure faults are detected and flagged early. Several types of sensors are used to monitor physical observables such as temperature, pressure, fluid flow rate and vibrations. Information related to changes in system performance is commonly distributed among these sensors. Typically, experts use their domain knowledge and experience to hand-craft features that capture relevant information across different sensor modalities. However, such features are not always complete and necessary domain knowledge may not be available in many situations.

BRIEF DESCRIPTION

According to an embodiment, a method includes converting time-series data from a plurality of prognostic and health monitoring (PHM) sensors into frequency domain data. One or more portions of the frequency domain data are labeled as indicative of one or more target modes to form labeled target data. A model including a deep neural network is applied to the labeled target data. A result of applying the model is classified as one or more discretized PHM training indicators associated with the one or more target modes. The one or more discretized PHM training indicators are output.

In addition to one or more of the features described above, or as an alternative, further embodiments could include where the PHM sensors are heterogeneous sensors that monitor at least two uncorrelated parameters of a monitored system.

In addition to one or more of the features described above, or as an alternative, further embodiments could include where the frequency domain data include spectrogram data generated for each of the PHM sensors covering a same period of time.

In addition to one or more of the features described above, or as an alternative, further embodiments could include where the one or more targeted modes include one or more fault conditions.

In addition to one or more of the features described above, or as an alternative, further embodiments could include where the deep neural network is a deep belief network with a soft max layer performing classification using a nonlinear mapping.

In addition to one or more of the features described above, or as an alternative, further embodiments could include where the model is trained using a supervised learning process to develop a plurality of weights in a pre-training process and tune the weights based on the labeled target data.

In addition to one or more of the features described above, or as an alternative, further embodiments could include the pre-training process includes applying a pre-training network of Restricted Boltzmann Machines to develop the weights to remove noise from one or more inputs including noise.

In addition to one or more of the features described above, or as an alternative, further embodiments could include where applying the model to the labeled target data is performed during a training process to train the model, and further including: applying the model in a testing process to unlabeled frequency domain data from one or more of the PHM sensors, classifying a result of applying the model as one or more discretized PHM result indicators, and outputting the one or more discretized PHM result indicators.

In addition to one or more of the features described above, or as an alternative, further embodiments could include creating different instances of the model for different target modes.

In addition to one or more of the features described above, or as an alternative, further embodiments could include where the one or more target modes include one or more health condition and one or more prognostic condition of a monitored system.

A further embodiment is a system that includes a sensor system and a PHM processor. The sensor system includes a plurality of PHM sensors. The PHM processor is operable to convert time-series data from the PHM sensors into frequency domain data, label one or more portions of the frequency domain data indicative of one or more target modes to form labeled target data, apply a model including a deep neural network to the labeled target data, classify a result of applying the model as one or more discretized PHM training indicators associated with the one or more target modes, and output the one or more discretized PHM training indicators.

Technical function of the embodiments described above includes creation and use of monitoring models from multiple sensor inputs for health and prognostic monitoring.

Other aspects, features, and techniques of the embodiments will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments automate the creation of system monitoring models integrating information across homogeneous or heterogeneous sensor inputs that enable more accurate health monitoring evaluation and prognostics of health related conditions such as remaining useful life.

Figure 1:
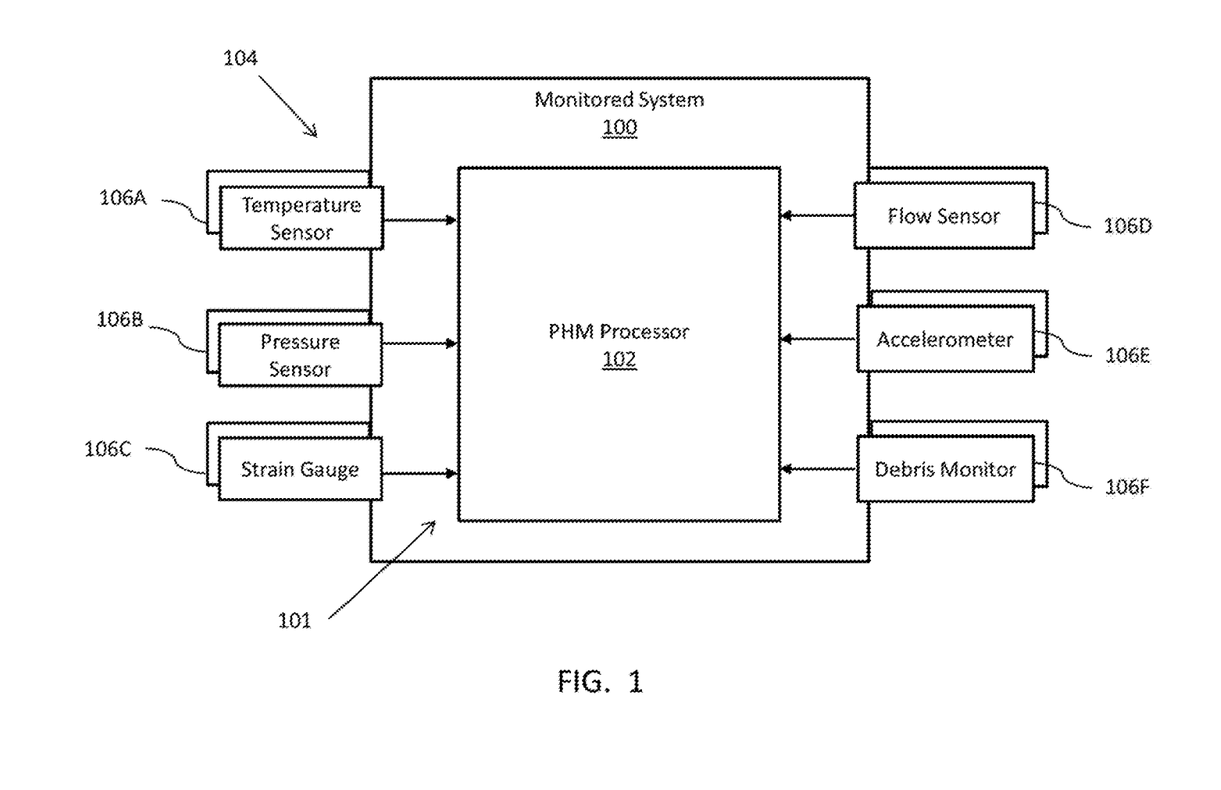
FIG. 1 illustrates a prognostic and health monitoring system according to an embodiment.

Referring now to the drawings, FIG. 1 illustrates a monitored system 100 that is monitored by a prognostic and health monitoring (PHM) system 101 that includes a PHM processor 102 coupled to a sensor system 104. The sensor system 104 includes a plurality of PHM sensors 106 that are configured to collect diagnostic and operational data related to the monitored system 100. The monitored system 100 can be any type of machine or system subject to detectable and predictable failure modes. For example, the monitored system 100 can be a vehicle, an engine, an HVAC system, an elevator system, industrial machinery, or the like. In the example of FIG. 1, the PHM sensors 106 are heterogeneous sensors that monitor at least two uncorrelated parameters of the monitored system 100, such as one or more temperature sensors 106A, pressure sensors 106B, strain gauges 106C, flow sensors 106D, accelerometers 106E, debris monitors 106F, and the like.

The PHM processor 102 is a processing system which can include memory to store instructions that are executed by one or more processors. The executable instructions may be stored or organized in any manner and at any level of abstraction, such as in connection with a controlling and/or monitoring operation of the sensor system 104 of FIG. 1. The one or more processors can be any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms in a non-transitory form.

Embodiments can use a deep neural network (DNN) model in the form of a deep belief network (DBN). A DNN model can include many hidden layers for PHM. Inputs to the DNN model may be from multiple PHM sensors 106 of the same kind (e.g., multiple accelerometers 106E) or different kinds and can include other non-sensor information. A DNN is a feedforward artificial neural network that has more than one layer of hidden units between its inputs and outputs. Each hidden unit, j, uses a nonlinear mapping function, often the logistic function, to map its total input from the layer below, $x_j$, to the scalar state, $y_j$, that it sends to the layer above, where $b_j$ is the bias of unit j, i is an index over units in the layer below, and $w_{ij}$ is the weight to unit j from unit i in the layer below. The values of $y_j$ and $x_i$ can be computed according to equation 1.

$$y_j = \frac{1}{1+e^{-x_j}} \text{ where } x_j = b_j + \sum_i y_i w_{ij} \quad \text{(Equation 1)}$$

For classification, the output unit j converts its total input, $x_j$ into a class probability, $p_j$ using a nonlinear mapping such as the soft max function of equation 2, where k is an index over all classes.

$$p_j = \frac{e^{x_j}}{\sum_k e^{x_k}} \quad \text{(Equation 2)}$$

Figure 2:
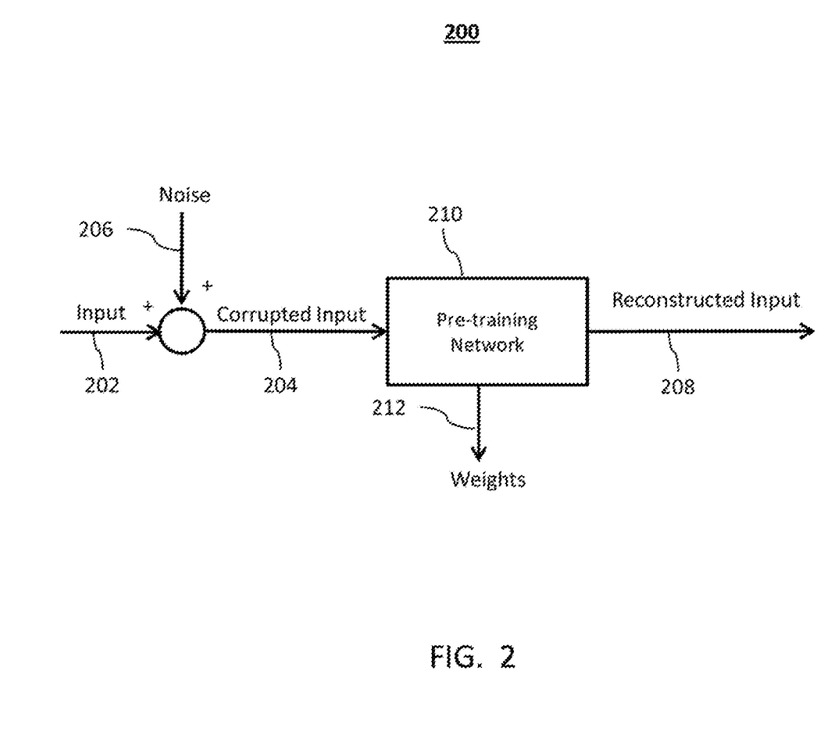
FIG. 2 illustrates a pre-training process according to an embodiment.

To train a DNN model, a pre-training process 200 can be performed as depicted in the example of FIG. 2. The pre-training process 200 uses a probabilistic Restricted Boltzmann Machine (RBM) approach, trying to reconstruct noisy inputs. The pre-training process 200 can involve the reconstruction of a clean sensor input from a partially destroyed/missing sensor 106. Sensor input (x) 202 becomes corrupted sensor input ($\bar{x}$) 204 by adding a variable amount (v) of noise 206 distributed according to the characteristics of the input data. The parameter v of noise 206 represents the percentage of permissible corruption in the network. A DNN model is trained to de-noise the inputs by first finding the latent representation $h = f_\theta(\bar{x}) = \sigma(W\bar{x}+b)$ from which to reconstruct the original input $y = f_{\theta'}(h) = \sigma(W'h+b')$ as reconstructed input 208.

Figure 3:
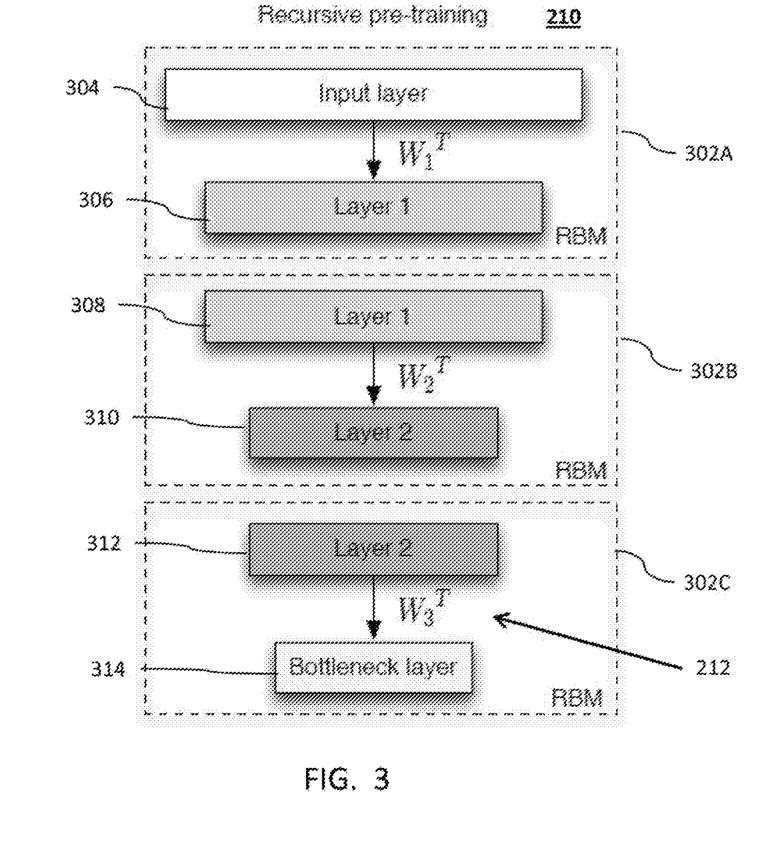
FIG. 3 illustrates a pre-training network according to an embodiment.

A pre-training network 210 can be used to determine weights 212 as further depicted in the example of FIG. 3. The pre-training network 210 includes a plurality of Restricted Boltzmann Machines 302A, 302B, 302C to develop the weights 212 to remove noise 206 from one or more corrupted inputs 204. The Restricted Boltzmann Machines 302A-302C can learn a probability distribution over a set of inputs. Stacking of the Restricted Boltzmann Machines 302A-302C forms a DBN. Each of the Restricted Boltzmann Machines 302A-302C is restricted in that its layers are paired groups with connections between layers but not between units in each layer. In the example of FIG. 3, Restricted Boltzmann Machine 302A applies weight $W_1^T$ to input layer 304 to reach layer 306. Restricted Boltzmann Machine 302B applies weight $W_2^T$ to layer 308 to reach layer 310. Restricted Boltzmann Machine 302C applies weight $W_3^T$ to layer 312 to reach bottleneck layer 314. The bottleneck layer 314 is a reduction layer that can produce a final result. Although FIG. 3 depicts only three layers, the number of layers can be scaled to any size to meet the size of the input data set.

To train a DNN, a pre-training step is performed, such as pre-training process 200 of FIG. 2. Pre-training typically attempts to train features that are good at modeling the structure within the data as a DBN. Training can also include a discriminative fine-tuning phase during which weights from pre-training are slightly adjusted using backpropagation for a specific application. Labeled target data is presented in the discriminative fine-tuning phase.

Figure 4:
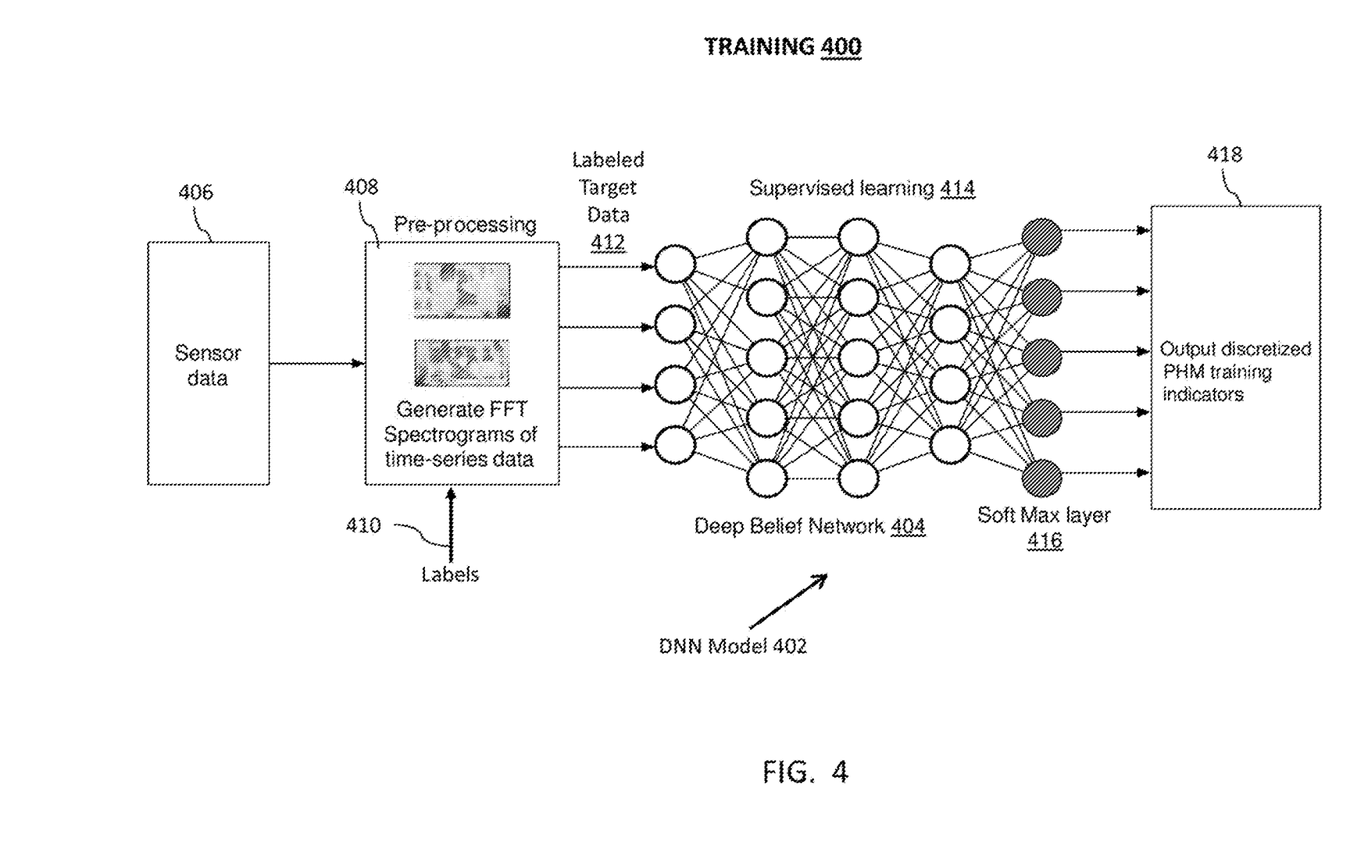
FIG. 4 illustrates a training process including a deep neural network model using a deep belief network according to an embodiment.

FIG. 4 illustrates a training process 400 including a deep neural network model 402 using a deep belief network 404 according to an embodiment. In the example of FIG. 4, time-series data 406 from a plurality of PHM sensors 106 of FIG. 1 is passed to pre-processing 408. The pre-processing 408 can include converting the time-series data 406 into frequency domain data. The pre-processing 408 can also use labels 410 to perform labeling of one or more portions of the frequency domain data indicative of one or more target modes to form labeled target data 412. The frequency domain data can be spectrogram data generated for each of the PHM sensors 106 covering a same period of time. For instance, a sliding window can capture data sets from each of the PHM sensors 106 over a period of time, and a series of Fast Fourier Transforms (FFTs) can be run to convert the time domain data into frequency domain data. The spectrograms can also normalize the data set sizes to support fusion of multiple sensor data sets.

The DNN model 402 including DBN 404 is applied to the labeled target data 412 in a supervised learning process 414. The supervised learning process 414 can include developing a plurality of weights 212 in pre-training process 200 and tuning the weights 212 based on the labeled target data 412. Fine tuning of the weights 212 may be performed using gradient descent and backpropagation. A result of applying the DNN model 402 can be classified as one or more discretized PHM training indicators associated with the one or more target modes. Classification can be performed in soft max layer 416 using nonlinear mapping according to the soft max function of equation 2. The one or more discretized PHM training indicators are output at block 418. The one or more discretized PHM training indicators can identify whether one or more health condition and/or one or more prognostic condition of the monitored system 100 are detected.

Different instances of the DNN model 402 can be created for different target modes. Once the DNN model 402 is initially trained, it can be presented with any number of target modes to model; therefore, multiple models for different tasks can be created from the same underlying DBN 404. DNNs have been shown to be able to make more effective use of the information present in the data for discriminative tasks and can be applied to detecting one or more fault conditions. Prognostics can be performed by learning over several time steps of data or presenting target label points from subsequent time steps.

Figure 5:
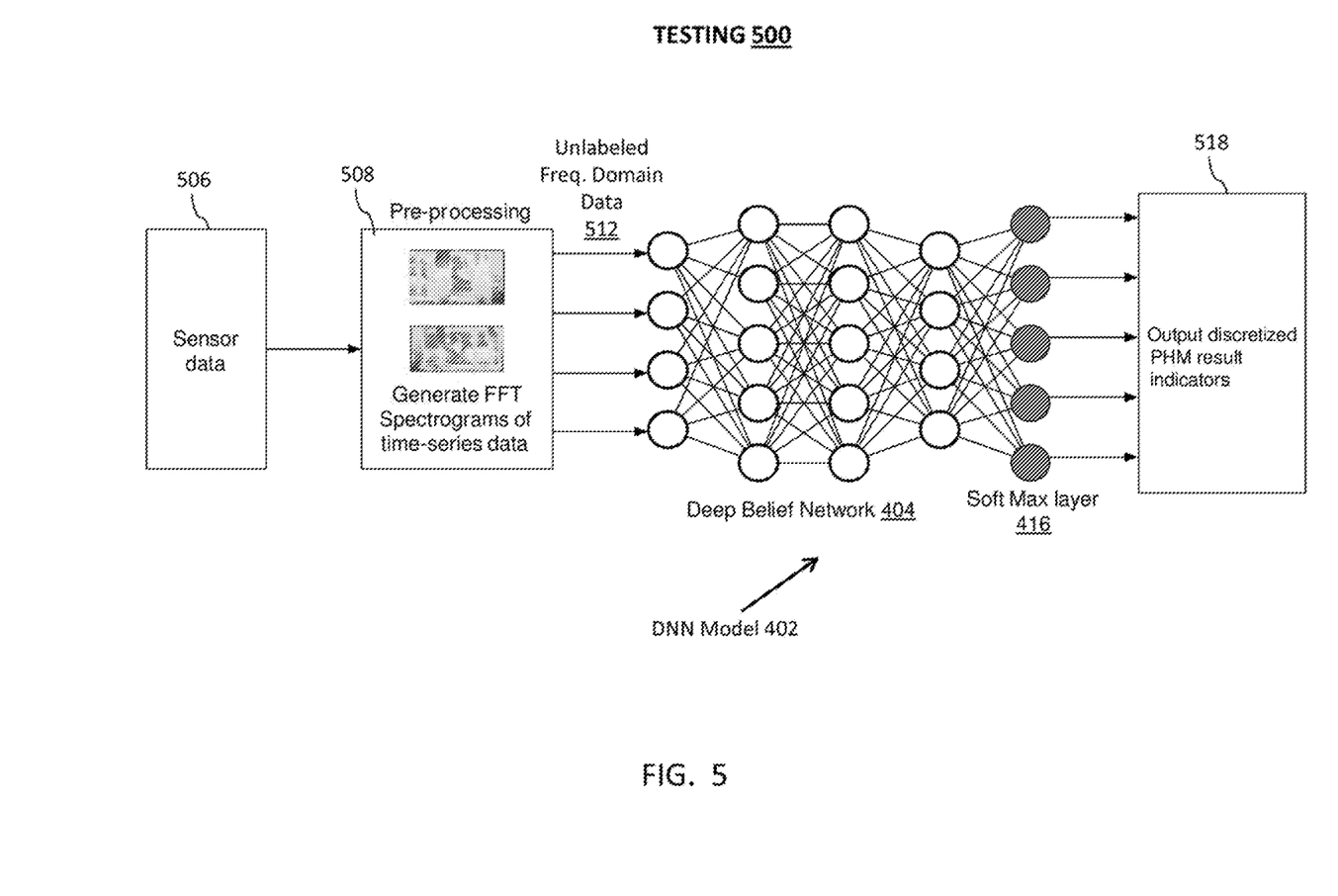
FIG. 5 illustrates a testing process using the model of FIG. 4 according to an embodiment.

FIG. 5 illustrates a testing process 500 using the DNN model 402 of FIG. 4 according to an embodiment. After the training process 400 of FIG. 4 is performed and values for the DNN model 402 are determined, the testing process 500 can apply the DBN 404 and soft max layer 416 of DNN model 402 to unlabeled frequency domain data 512 from time-series data 506 of one or more of the PHM sensors 106. Similar to FIG. 4, pre-processing 508 can include converting the time-series data 506 into frequency domain data. The frequency domain data can be spectrogram data generated for each of the PHM sensors 106 covering a same period of time. The soft max layer 416 can classify a result of applying the DBN 404 as one or more discretized PHM result indicators. The one or more discretized PHM result indicators can be output at block 518.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
converting time-series data from a plurality of prognostic and health monitoring (PHM) sensors into frequency domain data, wherein the PHM sensors are heterogeneous sensors that monitor at least two uncorrelated parameters of a monitored system, and the PHM sensors include at least two kinds of sensors from a set of one or more temperature sensors, one or more strain gauges, one or more flow sensors, one or more accelerometers, and one or more debris monitors;
performing data set size normalization of the frequency domain data to support fusion of multiple sensor data sets from the heterogeneous sensors, wherein the frequency domain data comprise spectrogram data generated for each of the PHM sensors covering a same period of time and normalizing the data set sizes using a sliding window;
labeling one or more portions of the frequency domain data indicative of one or more target modes to form labeled target data;
training a model based on a plurality of weights developed in a pre-training process configured to reconstruct an input of the PHM sensors in response to a corrupted sensor input generated by adding noise as part of the pre-training process, wherein the model is trained using a supervised learning process to develop the weights in the pre-training process and tune the weights based on the labeled target data and the pre-training process comprises applying a pre-training network of a plurality of stacked Restricted Boltzmann Machines to develop the weights to remove noise from one or more inputs comprising noise;
applying the model comprising a deep neural network to the labeled target data, wherein the deep neural network comprises at least one layer of hidden units between an input layer and an output layer, and each of the hidden units uses a nonlinear mapping function to map an input to a scalar state;
classifying a result of applying the model as one or more discretized PHM training indicators associated with the one or more target modes, wherein the classifying converts an output of the output layer of the deep neural network into a class probability indexed over a plurality of classes; and
outputting the one or more discretized PHM training indicators.

2. The method of claim 1, wherein the PHM sensors further comprise one or more pressure sensors.

3. The method of claim 1, wherein the one or more targeted modes comprise one or more fault conditions.

4. The method of claim 1, wherein the deep neural network is a deep belief network with a soft max layer performing classification using a nonlinear mapping.

5. The method of claim 1, wherein applying the model to the labeled target data is performed during a training process to train the model, and further comprising:
applying the model in a testing process to unlabeled frequency domain data from one or more of the PHM sensors;
classifying a result of applying the model as one or more discretized PHM result indicators; and
outputting the one or more discretized PHM result indicators.

6. The method of claim 1, further comprising:
creating different instances of the model for different target modes.

7. The method of claim 1, wherein the one or more target modes comprise one or more health condition and one or more prognostic condition of the monitored system.

8. A system comprising:
a sensor system comprising a plurality of prognostic and health monitoring (PHM) sensors, wherein the PHM sensors are heterogeneous sensors that monitor at least two uncorrelated parameters of a monitored system, and the PHM sensors include at least two kinds of sensors from a set of one or more temperature sensors, one or more strain gauges, one or more flow sensors, one or more accelerometers, and one or more debris monitors; and
a PHM processor operable to:
convert time-series data from the PHM sensors into frequency domain data;
perform data set size normalization of the frequency domain data to support fusion of multiple sensor data sets from the heterogeneous sensors, wherein the frequency domain data comprise spectrogram data generated for each of the PHM sensors covering a same period of time and normalizing the data set sizes using a sliding window;
label one or more portions of the frequency domain data indicative of one or more target modes to form labeled target data;
train a model based on a plurality of weights developed in a pre-training process configured to reconstruct an input of the PHM sensors in response to a corrupted sensor input generated by adding noise as part of the pre-training process, wherein the model is trained using a supervised learning process to develop the weights in the pre-training process and tune the weights based on the labeled target data and the pre-training process comprises applying a pre-training network of a plurality of stacked Restricted Boltzmann Machines to develop the weights to remove noise from one or more inputs comprising noise;
apply the model comprising a deep neural network to the labeled target data, wherein the deep neural network comprises at least one layer of hidden units between an input layer and an output layer, and each of the hidden units uses a nonlinear mapping function to map an input to a scalar state;
classify a result of applying the model as one or more discretized PHM training indicators associated with the one or more target modes, wherein classification converts an output of the output layer of the deep neural network into a class probability indexed over a plurality of classes; and
output the one or more discretized PHM training indicators.

9. The system of claim 8, wherein the PHM sensors further comprise one or more pressure sensors.

10. The system of claim 8, wherein the one or more targeted modes comprise one or more fault conditions.

11. The system of claim 8, wherein the deep neural network is a deep belief network with a soft max layer performing classification using a nonlinear mapping.

12. The system of claim 8, wherein application of the model to the labeled target data is performed during a training process to train the model and the PHM processor is further operable to apply the model in a testing process to unlabeled frequency domain data from one or more of the PHM sensors, classify a result of applying the model as one or more discretized PHM result indicators, and output the one or more discretized PHM result indicators.

13. The system of claim 8, wherein different instances of the model are created for different target modes.

14. The system of claim 8, wherein the one or more target modes comprise one or more health condition and one or more prognostic condition of the monitored system.

* * * * *